United States Patent
Rose et al.

[11] Patent Number: 5,482,578
[45] Date of Patent: Jan. 9, 1996

[54] DIFFUSION COATING PROCESS

[75] Inventors: Bernard R. Rose, Gloucester, Mass.; John K. Willis, Salem, N.H.

[73] Assignee: Walbar Inc., Peabody, Mass.

[21] Appl. No.: 212,274

[22] Filed: Mar. 14, 1994

Related U.S. Application Data

[63] Continuation of Ser. No. 875,375, Apr. 29, 1992, abandoned.
[51] Int. Cl.$^6$ .............................. C21D 9/00; C23C 10/56
[52] U.S. Cl. ...................... 148/516; 148/518; 427/252; 427/405; 427/383.1
[58] Field of Search ....................... 148/524, 535, 148/518, 516; 428/680; 427/252, 405, 383.1

[56] References Cited

U.S. PATENT DOCUMENTS

| | | | |
|---|---|---|---|
| 3,999,956 | 12/1976 | Stueber et al. | 29/194 |
| 4,142,023 | 2/1979 | Bornstein et al. | 428/680 |
| 4,293,338 | 10/1981 | Rose et al. | 75/253 |
| 4,526,814 | 7/1985 | Shankar et al. | 427/253 |
| 4,962,005 | 10/1990 | Alperine et al. | 148/518 |
| 5,057,196 | 10/1991 | Creech et al. | 428/652 |

FOREIGN PATENT DOCUMENTS 1210026 10/1970 United Kingdom.

*Primary Examiner*—Deborah Yee
*Attorney, Agent, or Firm*—Howard S. Reiter

[57] ABSTRACT

Process for producing novel nickel superalloy bodies having increased resistance of to oxidation and corrosion at high temperatures. The process comprises applying a thin layer of a platinum-group metal and heating to an elevated temperature to diffuse or integrate the platinum-group metal into the surface of the metal superalloy. Then the superalloy body is packed into a container filled with a diffusion powder composition containing sources of aluminum and chromium metals and heated in a hydrogen gas atmosphere to an elevated temperature to codeposit and diffuse aluminum and chromium into the platinum-group metal-treated surface. Finally, the superalloy body is removed from the diffusion coating container and heated to the solvus temperature to form a ductile surface having an outer zone microstructure comprising a normally brittle PtAl$_2$ which has been ductilized by the solutioning therein of beta chromium. This ductilized PtAl$_2$ may or may not be in a beta phase nickel aluminide matrix depending on substrate composition.

11 Claims, No Drawings

DIFFUSION COATING PROCESS

This is a continuation of application Ser. No. 07/875,375 filed on Apr. 29, 1992, now abandoned.

BACKGROUND OF THE INVENTION

1. Field of the Invention

The present invention relates to the coating of high temperature superalloys, such as high nickel- and high cobalt-superalloys to provide them with a protective outer layer which has improved resistance to oxidation and corrosion when subjected to such atmospheres at high temperatures. An important use of such superalloys is for turbine blades in jet aircraft or power generation engines which perform at high temperatures and in corrosive and oxidizing atmospheres.

2. Discussion of the Prior Art

It is known to form protective coatings on the surface of metal superalloy components, such as turbine blades, using metals to form layers which are more resistant to corrosion and/or oxidation at high temperatures than is the base superalloy.

According to one such procedure, disclosed in U.S. Pat. No. 3,677,789 by Bungardt et al., the base superalloy is first coated with a thin layer of noble metal, such as platinum, and is then subjected to a high temperature aluminum diffusion treatment for several hours to form a protective layer diffused into and integrated with the base superalloy. The formed protective surface layer comprises platinum aluminide which has the disadvantages of being brittle, subject to craze cracking and has low impact strength.

Diffusion coating compositions and procedures for diffusing both aluminum and chromium into superalloy base metal components in a single step are known from U.S. Pat. No. 4,293,338 by Rose et al. Thus, the prepared superalloy base component is packed into a conventional diffusion-coating container together with a powdered cementation pack coating composition containing intermetallic $CO_2Al_9$ powder and chromium metal powder, heated to about 1925°–1975° F. for about one-two hours in an inert gas atmosphere, removed and post-treated in a hydrogen atmosphere for about one hour at about 1950° F. A codeposited diffusion layer of aluminum and chromium is thereby provided at the superalloy metal surface, but in the absence of any platinum group metal.

According to another known procedure, disclosed in U.S. Pat. No. 4,526,814 by Shankar et al., protective diffusion layers of a platinum group metal, chromium and aluminum are formed at the surface of superalloy base components in a multi-step process in which the superalloy base component is first coated with the platinum group metal, post-platinized at about 1900° F. for three hours to diffuse the platinum metal into the superalloy, then high temperature-chromized at 1950° F. for eight hours to form a diffusion layer of the platinum group metal and chromium into the superalloy, and then high temperature-aluminized at about 1400° F. for five hours, to form a diffusion layer of the platinum group metal, chromium and aluminum into the superalloy base surface. Such procedure is tedious and expensive because of the several steps including the post-platinizing heating step and the pre-aluminizing heating step. Also, in cases where low amounts of chromium are diffused into the protective layer the layer is limited in effectiveness of protection to high temperature oxidation and high temperature hot corrosion application (2000° F.–1700° F.)

SUMMARY OF THE INVENTION

The present invention relates to a simplified process for the diffusion coating of metallic superalloy bodies or components with a platinum group metal to form an outer zone comprising an aluminide of a platinum group metal, or such an aluminide in a beta NiAl matrix, depending upon the substrate alloy or thermal cycle used, and then diffusion-coating the platinized substrate with an aluminum and chromium powder composition to codeposit and diffuse into the $PtAl_2$ a predetermined amount of beta chromium to render the normally-brittle $PtAl_2$ layer ductile. The formed ductile protective layer or zone substantially improves the high temperature stability of the superalloy bodies or components against corrosion, erosion and oxidation.

The novel process of the present invention comprises the steps of (a) depositing a uniform thin layer of platinum-group metal, preferably platinum, onto the surface of a high temperature-resistant superalloy body, such as a high-nickel or high-cobalt metal superalloy gas turbine blade, (b) applying a post-platinizing thermal cycle to diffuse the platinum-group metal into the superalloy surface and improve the adherence or bond between the platinum-group metal layer and the substrate prior to further processing, (c) diffusion-coating said platinized surface at elevated temperatures with a composition containing aluminum and a predetermined amount of chromium, and (d) subjecting the diffusion-coated superalloy body to a thermal treatment to produce a ductile protective microstructure layer comprising a matrix of platinum-group metal aluminide having solutioned therein a predetermined minor amount of beta chromium, or a beta matrix of $NiAl_3$ containing a said platinum-group metal aluminide having solutioned herein a predetermined minor amount of beta chromium.

The present diffusion process is not only simple, rapid and efficient but also self-regulating in that the platinum aluminide beta matrix is formed in the presence of predetermined critical amounts of chromium under diffusion conditions. This results in a solutioning of the beta chromium within the platinum aluminide matrix whereby ductilization of the formed protective layer is achieved after post-coating heat treatment to obtain the proper microstructure.

The present process is applicable to conventional high temperature superalloys which are commercially-available particularly for use in the jet turbine engine and power generation engine field. An assortment of such high nickel alloys are available from International Nickel Company under the designations IN-713 (12.5% chromium and 3% aluminum), IN-738 (16% chromium and 3% aluminum) and IN-792 (12.5% chromium and 3% aluminum). Other similar nickel superalloys are available under the designations Rene 80 (13.5% chromium and 3% aluminum), Mar-M 002 (9% chromium and 5.5% aluminum), and SRR-99 (8.5% chromium and 5% aluminum).

DETAILED DESCRIPTION OF THE INVENTION

The superalloy bodies or components which are treated according to the present invention are well known metal superalloys intended for high temperature performance, such as jet turbine components, particularly blades. Such alloys have a high content of nickel and/or of cobalt.

The first step of the present process involves depositing a uniform thin layer of a platinum-group metal, such as platinum, palladium or rhodium, onto the superalloy surfaces to be protected, using any desired coating procedure such as electroplating, chemical vapor deposition, or the like. Preferably, the superalloy surfaces are prepared to improve their receptivity for the coating and to exclude contaminants, such as by conventional chemical cleaning and/or degreasing procedures. The thickness of the platinum-group metal deposit preferably is between about 5–10 microns.

Next, the platinum-group metal-coated superalloy is subjected to a post-platinizing thermal cycle, such as by heating in vacuo to between about 1875° F. and 1925° F., preferably about 1900° F. ±15° F., for about 1 hour, to diffuse or integrate the platinum-group metal into the coated surface of the superalloy body and also to check the adherence of the platinum coating to the superalloy body. The choice of a temperature of about 1900° F. is dictated by the need to dilute the platinum-group metal concentration into the substrate so that the lattice parameter of the formed $PtAl_2$ will accomodate beta chromium diffusion, and also by the need to check adherence of the platinum-group metal layer.

The platinum-group metalized superalloy body is then subjected to conventional diffusion coating with an aluminum/chromium powder codeposition in a single step, using a diffusion powder-pack composition and procedure as disclosed in U.S. Pat. No. 4,293,338.

Finally, the Al/Cr diffusion-coated, metallized superalloy body is subjected to a post-coating heat treatment in hydrogen at about 1925° F. to 2050° F. for about one-to-two hours to produce the desired microstructure comprising a ductile platinum group metal aluminide matrix having solutioned therein from 3% to 6% by weight of beta chromium. The powder-pack compositions useful according to the present invention emit both aluminum and chromium at elevated temperatures below about 2000° F. and are resistant to being immobilized at about 2000° F. whereby they remain flowable after being heated for 2 hours at the diffusion temperatures, i.e., 1925° F. to about 1975° F. The composition contains over 90% by weight of a particulate inert filler, such as calcined aluminum oxide, a small amount of a halide carrier material or activator such as sodium fluoride or ammonium fluoride, and powdered sources of aluminum and chromium, such as $Co_2Al_9$ and chromium metal powder. The proportions of the metal source powders can be varied depending upon the composition of the base alloy and the properties desired. Higher aluminum contents produce greater oxidation resistance whereas higher chromium contents produce greater hot corrosion resistance. Generally, the aluminum source powder is present in an amount between about 1 to 15% by weight and the chromium source powder is present in an amount between about 2 and 6% by weight. Preferred powder compositions contain 3% by weight of $CO_2Al_9$ and from about 2% by weight (low chromium) to about 5% by weight (high chromium) of chromium powder.

The diffusion process is conducted by inserting the platinum-group metal-coated and thermally-cycled superalloy body or component into a diffusion powder box which is packed with the desired aluminum/chromium source powder composition. The powder box is heated rapidly in a hydrogen gas atmosphere to a temperature of 1850° F.–1950° F. for one-to-two hours to generate the aluminum and chromium vapors and simultaneously diffuse them and the platinum-group metal into the superalloy surface. Thereafter, the treated superalloy body is removed from the diffusion powder box, brushed clean and subjected to a post-coating heating step in which it is heated in a hydrogen atmosphere for about one-to-two hours at the gamma prime solvus temperature of the substrate, generally between about 1925° F. and 2050° F. depending upon the particular substrate alloy, to produce the desired ductile microstructure surface of platinum-group metal aluminide containing from 3% to 6% by weight of dissolved chromium. Preferred thermal cycling in the diffusion powder box comprises heating to 1875° F. ±25° F. for about one hour followed by heating to 1925° F. ±25° F. for about 30 minutes.

The following examples are given as illustrative and should not be interpreted as limitative.

EXAMPLE 1

Turbine blade workpieces, cast from a high-nickel, high-chrome alloy sold under the trade designation "IN-738" by the International Nickel Company, are degreased by exposure to trichloroethane solvent vapors. The area of the turbine blades to be subjected to the diffusion coating process are abrasively cleaned with $Al_2O_3$ grit (which passes a 120 mesh sieve but not a 220 mesh sieve). After this blasting process, the turbine blades are then electrolytic alkaline cleaned, electrolytic muriatic acid cleaned, rinsed in deionized water and then platinum plated in a bath consisting of:

8.2 g./l. of hexachloroplatinic acid, $H_2PtCl_6$,
45 g./l. of triammonium phosphate, $(NH_4)_3PO_4$,
240 g./l. of di-sodium hydrogen phosphate, $Na_2HPO_4$ The temperature of the bath was 72° C., the pH was 7.5, the current density 50 amps./sq. ft. and the voltage 2.5 volts. The blades were plated for two hours and 15 minutes under these conditions. Different thickness of the platinum coating can be deposited by altering the treatment times accordingly.

After being platinum coated, the parts are thermally-cycled at 1900° F. ±15° F. for one hour to diffuse or integrate the platinum into the coated surface of the superalloy and to check the adherence of the said platinum coating with the substrate superalloy.

Next, the platinized turbine blades are inserted into a coating container, which has been prepared according to procedures known in the art, and packed in a coating powder formulation comprising:

| Constituents | % by weight |
| --- | --- |
| Calcined aluminum oxide (pass 100 mesh) | 94.5% |
| $Co_2Al_9$ (pass 325 mesh) | 3.0% |
| Chromium powder (pass 325 mesh) | 2.0% |
| Ammonium Fluoride | 0.5% |

This is designated as the RB-505A blend and has a high aluminum content for applications requiring high oxidation resistance.

Workpieces are placed in the coating container in spaced relation so that there is about a 0.75" gap between adjacent pieces.

The powder box is loaded into a retort which is provided with means to circulate gas therethrough, means to insert thermocouples thereinto for the remote reading of temperature therein and a sand seal to prevent the ingress of air thereto. After the retort is closed, it is purged with hydrogen gas at a rate of about 7 volume changes per hour and then placed into a gas-fired pit furnace. Hydrogen gas is constantly fed into the retort at a rate of about 5 volume changes per hour as the temperature inside the retort was rapidly raised to 1875° F. ±25° F., and held there for an hour, then raised to 1925° F. ±25° F. and held there for 30 minutes. The retort was then withdrawn from the furnace, and the parts were unpacked from the powder pack.

The coated nickel-base turbine blades were carefully cleaned with a stiff-bristled brush and compressed air. Thereupon, the part was inspected and washed for three minutes in warm water and dried.

The parts were then loaded in a clean retort not previously used for diffusion coating and heat treated under vacuum in a hydrogen atmosphere for 1 to 2 hours at 1925° F. to 2050° F., depending on the microstructure desired. Purging technique and gas flow rates are similar to that described for the diffusion coating process, above.

After metallographic examination of a test piece so treated, an excellent codeposited diffusion coating of about 0.0025 inches in depth was achieved during this process.

A microhardness scan of the outer zone of the formed coating shows increased ductility compared to that of a conventional platinum-reinforced aluminide surface. Thus, while a brittled platinum aluminide coating has an average Knoop Hardness Number (KHN) of about 954, compared to a typical KHN of about 502 for the metal superalloy per se, the present platinum aluminide coatings containing solutioned chromium have a KHN of about 806 and are ductile and non-brittle.

EXAMPLE 2

Example 1 is repeated but with a turbine nozzle guide vane of IN-713 alloy which is a low chromium content alloy intended for use in a high hot corrosion environment and which is platinum-coated and thermally-cycled as in Example 1. The following diffusion powder formulation is used:

| Constituents | Parts by Weight |
| --- | --- |
| $Co_2Al_3$ #325 mesh | 3.0 |
| Chromium, #325 mesh | 4.0 |
| NaF | 0.5 |
| Calcined aluminum oxide, #100 mesh | 92.5 |

This is designated as the RB505-B blend and has a high chrome content for applications requiring high hot corrosion resistance.

The pack temperature was 1900° F. and the treatment time was two hours in a hydrogen atmosphere. The post-treatment was at 1975° F. for one hour in a partial pressure of argon of 10 to 15 microns and resulted in an excellent codeposited diffusion coating of platinum, aluminum and chrome of 0.003 inches in depth.

EXAMPLE 3

This example relates to the protection of hollow-turbine blades of medium chromium content Rene 80 superalloy having internal cooling passages.

Example 1 was repeated except that the platinized, thermally-cycled parts have small apertures or conduits about 0.020 inches in diameter. The platinized parts are supported on a vibrating table so that orifices, conduits and interstices, as small as 0.010 inch, are upwardly. Lower outlets of such orifices are taped to prevent egress of powder. Then, while the table is vibrated, the orifices, conduits and interstices are filled with a powder of the following formulation:

| Constituents | Parts by Weight |
| --- | --- |
| $Co_2Al_9$ #325 mesh | 10.0 |
| Chromium, #325 mesh | 1.0 |
| $NH_4F$ | 0.75 |
| Calcined, aluminum oxide, #100 mesh | 88.25 |

This is designated as the RB505-E blend for applications requiring high hot corrosion resistance of internal surfaces.

After the interstices are filled and the upper outlets taped shut, vibrating is continued for about two minutes. Then the turbine blades are carefully packed in the RB505-B blend of Example 2.

The heat treating step is carried out at about 1925° F. for two hours in an argon atmosphere and an excellent codeposited diffusion coating was obtained simultaneously on the interior and exterior surfaces of the articles being treated.

This procedure for simultaneously applying an internal coating and external coating using two pack chemistries and a single thermal cycle is known as SIMULCOAT™.

It is to be understood that the above described embodiments of the invention are illustrative only and that modifications throughout may occur to those skilled in the art. Accordingly, this invention is not to be regarded as limited to the embodiments disclosed herein but is to be limited as defined by the appended claims.

We claim:

1. Process for increasing the resistance of metal superalloys to oxidation and corrosion at high temperatures comprising the steps of:

(a) applying to the surface of a nickel superalloy body a thin layer of a platinum-group metal;

(b) heating the superalloy body to an elevated temperature to diffuse or integrate the platinum-group metal into the surface of the metal superalloy;

(c) packing the superalloy body into a diffusion coating container filled with a diffusion powder composition containing a source of from about 1% to 15% by weight of aluminum and from about 2% to 6% by weight of chromium powder, said composition being in contact with the surface of said superalloy body into which said platinum-group metal has been diffused or integrated;

(d) heating said diffusion powder composition in a hydrogen gas atmosphere to an elevated temperature for a sufficient period of time to diffuse both aluminum and chromium into said surfaces; and (e) removing said superalloy body from said diffusion coating container and heating it to the solvus temperature of the superalloy body to form a body having oxidation-resistant and corrosion-resistant ductile surfaces having a microstructure comprising an outer zone of a normally brittle aluminide of said platinum-group metal which is ductilized by the solutioning therein of beta chromium.

2. Process according to claim 1 in which said platinum-group metal comprises platinum.

3. Process according to claim 1 in which said superalloy body comprises a major amount by weight of nickel.

4. Process according to claim 1 in which said diffusion powder composition comprises a mixture of $Co_2Al_9$ powder and chromium metal powder.

5. Process according to claim 4 in which said diffusion powder composition contains from about 1% to 15% by weight of $Co_2Al_9$ powder and from about 2% to 6% by weight of chromium metal powder.

6. Process according to claim 1 in which step (a) comprises electroplating the surface of the nickel superalloy body with a layer of said platinum-group metal having a thickness up to about 10 microns.

7. Process according to claim 1 in which the heating in step (b) is conducted at a temperature between 1875° F. and 1925° F.

8. Process according to claim 1 in which the heating in step (d) is conducted at a temperature between 1850° F. and 1950° F.

9. Process according to claim 1 in which the heating in step (e) is conducted at a temperature between 1925° F. and 2050° F.

10. Process according to claim 1 in which the aluminide is platinum aluminide which has solutioned therein from 3% to 6% by weight of the chromium.

11. Process according to claim 1 in which said ductilized platinum aluminide is present within a beta phase nickel aluminide matrix.

* * * * *